(12) United States Patent
Fujiwara et al.

(10) Patent No.: US 8,074,832 B2
(45) Date of Patent: Dec. 13, 2011

(54) HINGE STRUCTURE FOR A CONSOLE BOX LID

(75) Inventors: Yuji Fujiwara, Tokyo (JP); Yukihiro Sanma, Tokyo (JP)

(73) Assignee: Moriroku Technology Company, Ltd., Tokyo (JP)

(*) Notice: Subject to any disclaimer, the term of this patent is extended or adjusted under 35 U.S.C. 154(b) by 328 days.

(21) Appl. No.: 12/511,223

(22) Filed: Jul. 29, 2009

(65) Prior Publication Data

US 2010/0050380 A1     Mar. 4, 2010

(30) Foreign Application Priority Data

Aug. 2, 2008  (JP) ................................ 2008-200285

(51) Int. Cl.
*B60J 7/00* (2006.01)
(52) U.S. Cl. ...................... 220/811; 296/24.34; 296/37.8
(58) Field of Classification Search ............... 296/24.34, 296/37.8; 220/811, 812
See application file for complete search history.

(56) References Cited

U.S. PATENT DOCUMENTS

| 7,234,746 | B2 | 6/2007 | Sakakibara et al. | |
|---|---|---|---|---|
| 2009/0278370 | A1* | 11/2009 | DePue | 296/24.34 |
| 2010/0156129 | A1* | 6/2010 | Evans et al. | 296/24.34 |
| 2010/0207414 | A1* | 8/2010 | Tsuda et al. | 296/37.8 |

FOREIGN PATENT DOCUMENTS

| JP | 2006-27476 A | 2/2006 |
|---|---|---|
| JP | 2007-276572 A | 10/2007 |

* cited by examiner

*Primary Examiner* — Joseph Pape
(74) *Attorney, Agent, or Firm* — Leydig, Voit & Mayer, Ltd.

(57) ABSTRACT

A hinge structure for a lid of an in-vehicle console box includes a storage box having an opening, a lid having a front end and a rear end, and a hinge member having a rotation axis. The hinge member is disposed between the storage box and the lid so the lid rotates around the rotation axis to open and close the opening. A slide mechanism is located between the lid and the hinge member so the lid can move in the directions of the front end and the rear end in relation to the hinge member when opening and closing the lid. A converting mechanism converts a turning force for rotating the lid around the rotation axis to a linear force for sliding the lid in the directions of the front end and rear end so the lid moves in the direction of the rear end when being opened, and in the direction of the front end when being closed.

16 Claims, 7 Drawing Sheets

HINGE STRUCTURE FOR A CONSOLE BOX LID

TECHNICAL FIELD

The present invention relates to a hinge structure of a storage box lid for a console box to be installed in a vehicle interior.

BACKGROUND OF THE INVENTION

Japanese Patent Publication No. 2006-27476 discloses an opening/closing mechanism of a storage box that is capable of making operational property favorable involving opening and closing operation of a lid without requiring electric power. The opening/closing mechanism comprises a pivot shaft 25 disposed in the backward of a box body 13, a base panel 22 adapted to rotate around the pivot shaft 25, a lid 14 connected to the base panel 22 through a slide groove 21 and a slide pin 23 and adapted to be slidable in an anteroposterior direction of the box body 13, guide pins 19 formed on the lid 14, and guide grooves 17 formed on the sidewalls of the box body 13 to receive the guide pins 19 slidably. The guide groove 17 is comprised of a linear part and an arc-shaped part, wherein the linear part extends from an anterior end to a middle portion of the guide groove 17 with ascending moderately toward the middle portion, while the arc-shaped part extends from the middle portion to a posterior end of the guide groove 17 with rising steeply toward the posterior end. The arc-shaped part extends along a circular arc centering on the pivot shaft 25. As the lid 14 is pulled toward the backward of the box body 13, the guide pin 19 of the lid 14 moves along the guide groove 17 of the box body 13. While the guide pin 19 moves along the linear part of the guide groove 17, the base panel 22 relatively moves toward the front end of the lid 14, thereby making the distance between the front end of the lid 14 and the rotary shaft 15 short. As the guide pin 19 subsequently moves along the arc-shaped part of the guide groove 17, the lid 14 and the base panel 22 are made to rotate around the pivot shaft 25 by camming action caused between the arc-shaped part and the guide pin 19, and the box body 13 is opened. Then, the front end of the lid 14 and the pivot shaft 15 come close to each other and the front end of the lid 14 traces a circular track of smaller radius centering on the pivot shaft 25. Consequently, a vehicle driver can rotate a front end of the lid 14 along a circular arc having a reduced radius when opening and closing the lid and this improves operationality of the lid 14. In addition, it is advantageous that the biasing force for assisting closing movement of the lid 14 should be a turning force centering on the pivot shaft 25 as far as the guide pin 19 moves along the arc-shaped part of the guide groove 17 and a linear force toward the frontward of the box body as far as the guide pin 19 moves along the linear part of the guide groove 17. In order to accumulate the turning force and the linear force when opening the lid 14, the opening/closing mechanism comprises two independent accumulation mechanisms for storing these biasing forces. The first accumulation mechanism is composed of a drum 26 and a constant load spring 27 in order to store the linear force while the lid 14 moves along the linear part of the guide groove 17. The second accumulation mechanism is composed of a rotary gear 28, a torsion coil spring 29, a gear wheel 31, a pinion 32 and a rack 33 so as to store the turning force while the lid 14 moves along the arc-shaped part of the guide groove 17.

Japanese Patent Publication No. 2007-276572 discloses a storage box comprising a first guide groove 12 and a second guide groove 13. The first guide groove 12 leads the lid 2 in an anteroposterior direction of a box body 1 while the lid 2 is kept closed. The second guide groove 13 makes the lid 2 rotate together with a rotary member 4 so as to open or close the lid 2, after the lid 2 is disengaged from the first guide groove 12 and then engages with the rotary member 4 in the rear position of the box body 1. The first guide groove 12 is formed to allow a vehicle driver to adjust the position of the lid 2 to his physique, especially when the lid 2 is used as an armrest, by moving the lid 2 in an anteroposterior direction of the box body 1. However, the second guide groove 13 is formed to open and close the storage box by rotating the lid 2, only when the lid 2 is in the rear portion of the box body 1. Therefore, the feature of the first guide groove 12 can be clearly distinguished from the feature of the second guide groove 13. Since either the first guide groove 12 or the second guide groove 13 engages with the lid 2 continuously, the storage box can provide not only a useful armrest but also a storage box lid that can be rotated along a circular arc having a reduced radius when the lid is drawn backward.

However, the guide groove for controlling opening and closing movement of the lid must be formed on the sides of the box body as described in Japanese Patent Publication No. 2006-27476. In order to prevent the arm of the lid from hitting against the goods stored in the box body as the guide pin moves along the guide groove, it is needed to form such a protective side wall as described in paragraphs 0003 to 0005 of Japanese Patent Publication No. 2007-276572.

Instead of forming the foregoing protective side wall, the guide groove disclosed in Japanese Patent Publication No. 2006-27476 may be formed as a second guide groove on the outside surface of the rear side wall of the box body as described in paragraph 0032 of Japanese Patent Publication No. 2007-276572. If a bar-like projection that is formed on the transfer member is inserted into the second guide groove as described in paragraph 0037 and FIG. 8 of Japanese Patent Publication No. 2007-276572, however, it is also needed to form a space for storing the transfer member in the box body.

In other words, the existing devices disclosed in Japanese Patent Publication Nos. 2006-27476 and 2007-276572 require a guide groove to be formed on the inside surface or outside surface of the box body so as to control the direction of rotation of the lid when opening and closing the lid. Consequently, Consequently, various sorts of parts or members such as a guide pin, a bar-like projection, an arm and a transfer member must be disposed on a side surface of the box body. In addition, a space for storing the arm and the transfer member etc. must be formed on the side surface of the box body.

Furthermore, the existing devices disclosed in Japanese Patent Publication Nos. 2006-27476 and 2007-276572 are adapted to reduce the distance between a front end of the lid and a rotation axis of the lid preparatory to open the lid, by virtue of a linear part of the guide groove, which extends from an anterior end to a middle portion of the guide groove and rises gently toward the middle portion. With use of this mechanism, a vehicle driver can rotate a front end of the lid along a circular arc having a reduced radius when opening and closing the lid. When opening the lid, therefore, a closed lid must be drawn toward the back of the storage box in a predetermined distance preparatory to open the lid. When closing the lid, a closed lid may be moved toward the front of the storage box in a prescribed distance after the lid has been closed by tuning the lid around the rotation axis thereof.

In addition, the existing devices disclosed in Japanese Patent Publication Nos. 2006-27476 and 2007-276572 make the lid open and close by sliding a guide pin in a guide groove acting as a cam groove. The guide groove is composed of a liner part extending from an anterior end to a middle portion of the guide groove and rising gently toward the middle portion, a convex curve part steeply raising along a circular arc centering on a rotation axis of the lid and extending from the middle portion to a posterior portion of the groove, and a concave curve part of small diameter connecting the linear part to the convex curve part at the middle portion of the groove. The second groove of Japanese Patent Publication No. 2007-276572 corresponds to the aforementioned guide groove. Consequently, the sliding direction of the guide pin cannot help changing significantly in the concave curve part of the guide groove. In order to slide the guide pin smoothly in the concave curve part of the guide groove when closing the lid, the existing devices require means for biasing the lid in the closing direction. A force to bias the lid toward the closing direction should be a turning force centering on the rotation axis of the lid when the guide pin is sliding in the convex curve part extending from the posterior end of the groove to the middle portion of the groove, while the biasing force should be a linear force directed to the front end of the box body when the guide pin is sliding in the linear part extending from the middle portion of the groove to the anterior end of the groove. Consequently, the existing device disclosed in Japanese Patent Publication No. 2006-27476 has a first accumulation means and a second accumulation means in order to accumulate the turning force and the linear force, separately, when opening the lid. As for the device of Japanese Patent Publication No. 2007-276572, the lid is forced to rotate in the closing direction by means of a couple of springs 47, 48 and forced to move in the horizontal direction by means of one of the springs 47, 48, when closing the lid. The both devices of Japanese Patent Publication Nos. 2006-27476 and 2007-276572 have a complicated lid-closing mechanism composed of a lot of parts.

SUMMARY OF THE INVENTION

The objective of the present invention is to provide a hinge structure of a console box lid wherein an opening and closing operation of the lid can be completed in a single movement of the lid, respectively.

The other objective of the present invention is to provide a hinge structure of a console box lid, which has a simple structure that can be composed of a smaller amount of parts, so that the hinge structure can be readily downsized, while a capacity of the storage box can be increased.

Another objective of the present invention is to provide a hinge structure of a console box lid, which makes the lid move in the backward direction with the use of a turning force for rotating the lid around a rotation axis of a hinge member, thereby improving usability of the console box.

Another objective of the present invention is to provide a hinge structure of a console box lid, wherein a handling end of the lid is adapted to trace a generally convex and smoothly curved line, which extends along a circular arc having a reduced radius, throughout the operating range of the lid, thereby obtaining a favorable handling ability of the console box lid.

Another objective of the present invention is to provide a hinge structure of a console box lid, which prevents a front end of the lid from becoming too distanced from a console box when opening and closing the lid, thereby improving the maneuverability of the console box lid, especially when handling the front end of the lid.

The hinge structure of a console box lid according to the present invention comprises a storage box having an opening, a lid having a front end and a rear end, a hinge member having a rotation axis and disposed between the storage box and the lid so that the lid can rotate around the rotation axis to open and close the opening, a slide mechanism disposed between the lid and the hinge member so that the lid can move in the directions of the front end and the rear end in relation to the hinge member when opening and closing the lid, and a convert mechanism for converting a turning force for rotating the lid around the rotation axis to a linear force for sliding the lid in the directions of the front end and the rear end through the slide mechanism, whereby the convert mechanism makes the lid move in the direction of the rear end when opening the lid, and the convert mechanism makes the lid move in the direction of the front end when closing the lid.

Thereby, according to the present invention, the opening and closing operation of the storage box lid can be completed in a single movement of the lid, respectively, because the storage box lid moves in the direction of the front end or the rear end only by turning the lid around the rotation axis of the hinge member.

Furthermore, the convert mechanism used in the hinge structure of the present invention has a simple structure that can be composed of a smaller amount of parts, so that the hinge structure can be readily downsized and a capacity of the storage box can be increased, because the convert mechanism directly converts a turning force for rotating the lid around the rotation axis to a linear force for sliding the lid.

Furthermore, according to the present invention, the moving direction of the handing end of the lid does not change drastically during opening and closing movement of the lid, because the handling end of the lid moves by tracing a generally convex and smoothly curved line, thereby obtaining a favorable handling ability of a storage box lid.

When the storage box is disposed at the side of a driver's seat for use as an in-vehicle console box, a driver puts his fingers on the front end of the lid, that is, the handling end of the lid, and moves the lid in the anteroposterior direction of the lid to open and close the storage box. When opening the storage box, the lid is gradually moving toward the backward of the storage box while the lid is rotating around the rotation axis of the hinge member that is disposed at the rear of the storage box. Consequently, the handling end of the lid is prevented from becoming too distanced from the rotation axis of the hinge member as the lid moves to open the storage box. Therefore, according to the present invention, the distance between the front end of the lid and the storage box can be kept small throughout the operating range of the lid when the storage box is opened. When the storage box is closed, the handling end of the lid moves toward the front end of the storage box by tracing the track that was created by the handling end of the lid as the lid moved to open the storage box. Therefore, the range of vertical motion of a driver's operation arm can be kept small throughout the operating range of the lid when a driver lays his fingers on the front end of the lid and performs the opening and closing operations of the storage box. Consequently, the driver can open and close the storage box without changing his posture.

The convert mechanism used in the hinge structure according to the present invention comprises a first rack formed on the storage box and convexly curved along a circular arc centering on the rotation axis of the hinge member, a second rack formed on the lid and linearly extending in the direction of the front end and the rear end, and a pinion gear attached to the hinge member and adapted to rotate around an axis extending parallel to the rotation axis, wherein the pinion gear comprises a first gear engaging with the first rack, and a second gear engaging with the second rack to rotate in the same direction as the first gear by following the rotation of the first gear.

The pinion gear may comprise a first gear engaging with the first rack, and a second gear engaging with the second rack and integrated with the first gear so as to rotate in the same direction and at the same rotation angle as those of the first gear.

The first rack may be formed as a quadrant-shaped gear secured to the storage box, wherein the center axis of the quadrant-shaped gear is superimposed on the rotation axis of the hinge member. The second rack may be formed by a rack secured to the undersurface of the lid.

Since the convert mechanism is composed of a small amount of parts and disposed in a space between the hinge member and the lid, the convert mechanism does not need a large extra space for installation. Consequently, the storage box can be downsized without difficulty, while the capacity of the storage box can be enlarged.

Furthermore, the hinge structure of the present invention may be provided with a lock mechanism, which is disposed between the lid and the hinge member so as to secure the lid to the hinge member when the lid closes the opening of the storage box. In addition, a release mechanism may be installed in the hinge structure in order to disengage the lid from the hinge member when opening the lid. As a result, the lid can be secured to the storage box firmly when the lid is closed, and the lid can be released easily when opening the storage box.

The aforementioned features of the present invention will be clearly defined together with other advantages to be produced from the present invention with reference to the following description on the preferred embodiment of the present invention and the attached drawings.

DETAILED DESCRIPTION OF THE PREFERRED EMBODIMENT

Figure 1:
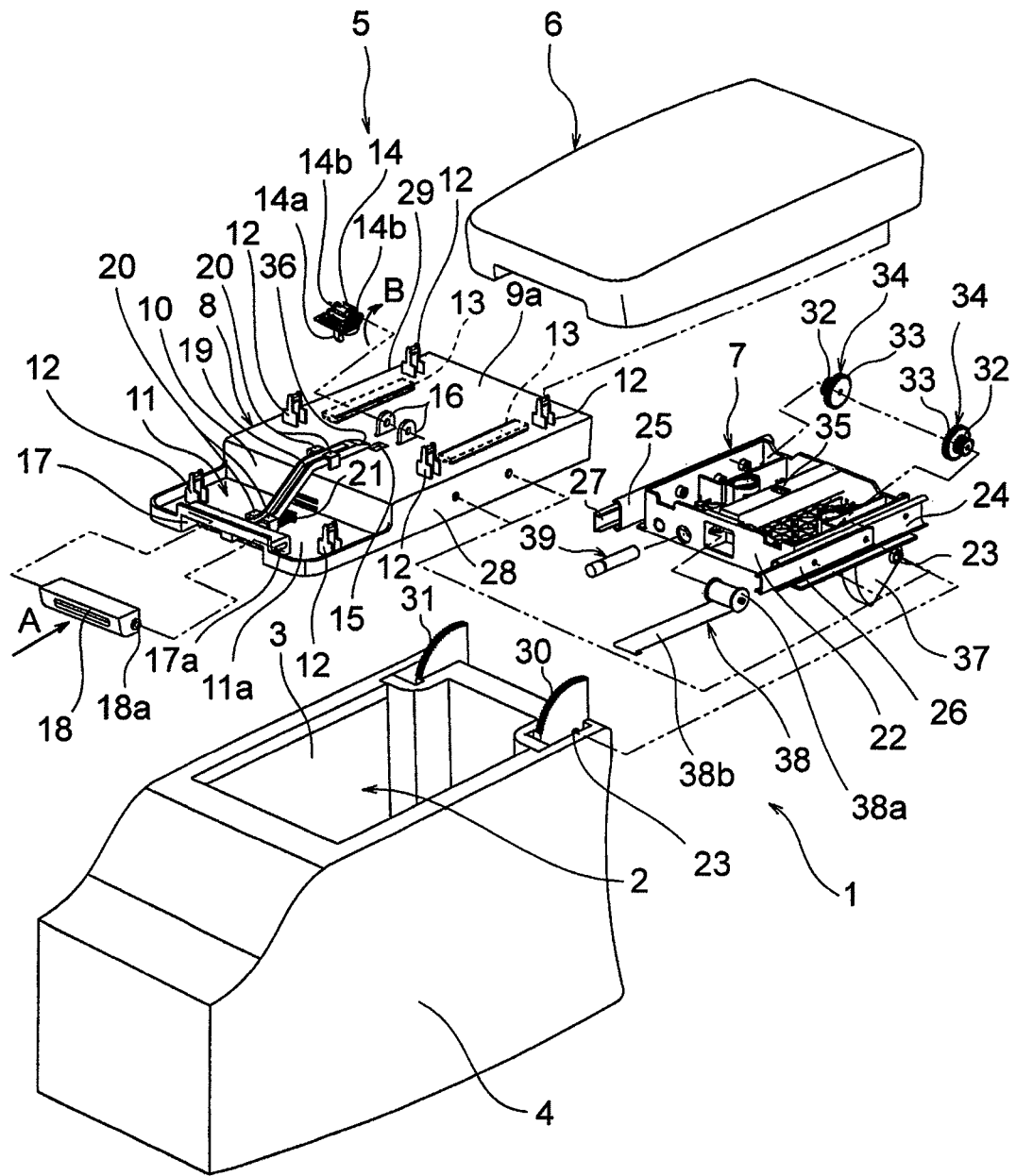
FIG. 1 is an exploded perspective view of an embodiment of the present invention, wherein the hinge structure is applied to an in-vehicle console box.

FIGS. 1-7 illustrate one embodiment of an in-vehicle console to which the present invention is applied. The console 1 comprises a storage box 3 having an opening 2 on the upper side thereof, a console panel 4 covering a peripheral border of the opening 2 of the storage box 3 and the side surfaces of the storage box 3, a lid 5 covering the opening 2, and a hinge member 7 for mounting the lid 5 on the storage box 3 so as to open and close the storage box 3. The lid 5 comprises an armrest 6 and a bottom plate member 8 forming a bottom plate of the armrest 6. The bottom plate member 8 is attached to the armrest 6 to define a recess 9 that has an opening on the bottom surface of the armrest 6. The hinge member 7 is received in the recess 9.

Figure 2:
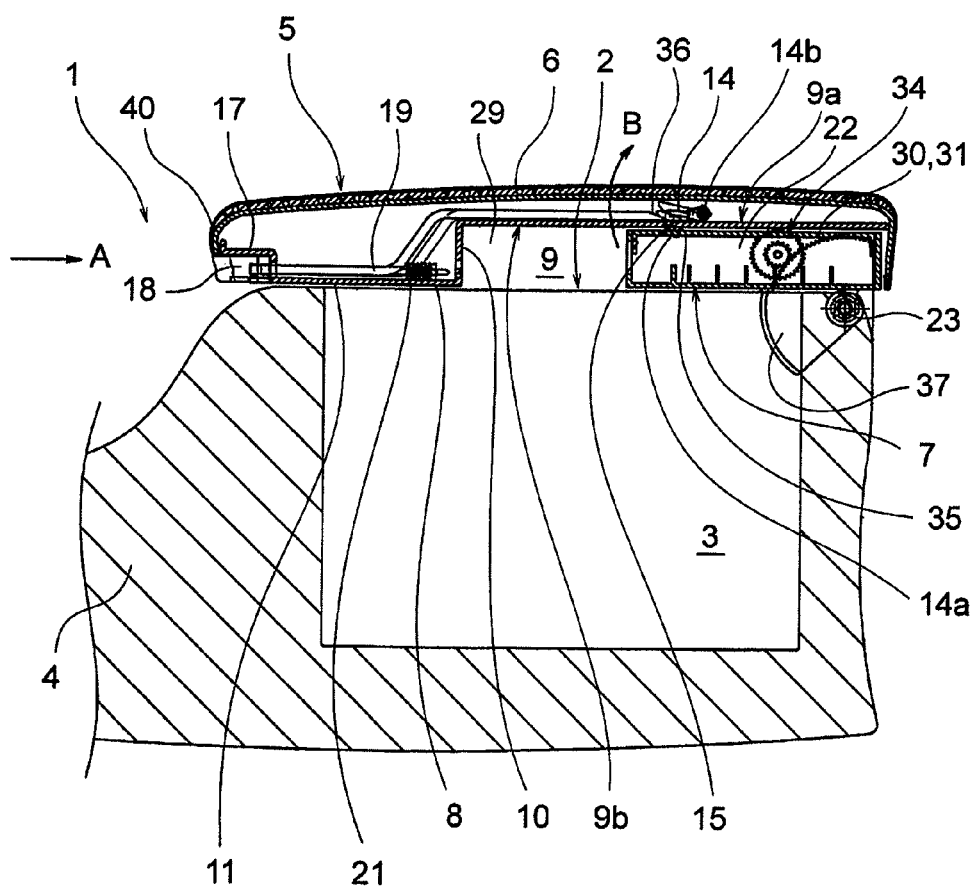
FIG. 2 is a vertical sectional view of the storage box illustrated in FIG. 1, wherein the storage box is closed.
Figure 3:
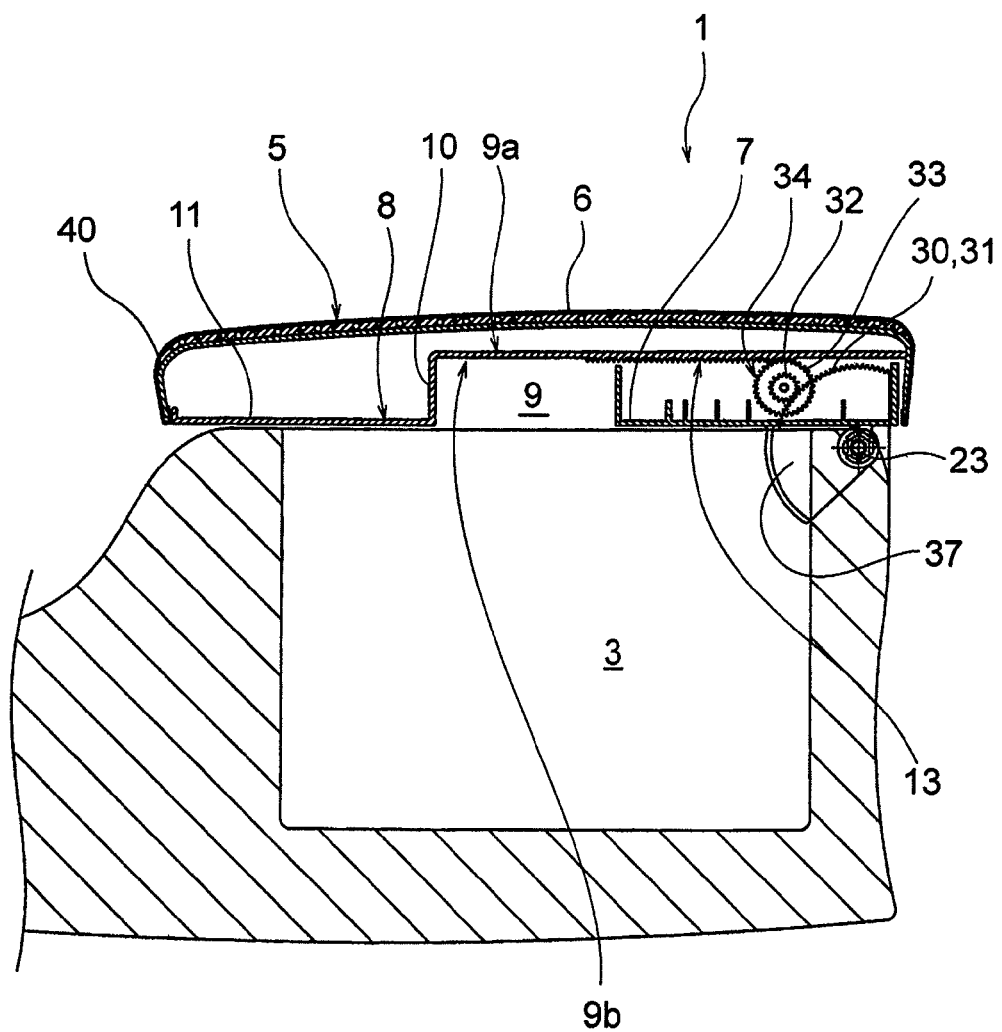
FIG. 3 is a sectional view of the hinge structure of FIG. 1, wherein a relevant part of the hinge structure is illustrated.

As illustrated in FIGS. 1-3, a plurality of locking protrusions 12 are formed on the upper surface 9a of the bottom plate member 8. Some of them are disposed on a ceiling portion of the recess 8 and the remaining protrusions are disposed on the upper surface 11a of a step portion 11 that extends from a front wall 10. The locking protrusions 12 project upward from the upper surfaces 9a, 11a of the bottom plate member 8. The bottom plate member 8 is secured to the armrest 6 by connecting the locking protrusions 12 to the under surface of the armrest 6. A pair of second racks 13 are arranged in the ceiling portion of the recess 9 and formed on or fixed to the under surface 9b of the bottom plate member 8. The second racks 13 extend in parallel with each other and leave a space therebetween. The second racks 13 linearly extend in the anteroposterior direction of the armrest 6. The bottom plate member 8 extending in the ceiling portion of the recess 9 is provided with a latch hole 15 with which a latch hook 14a of a latch member 14 engages. The latch hole 15 penetrates through the bottom plate member 8 extending in the ceiling portion of the recess 9. A pair of support plates 16 is formed on the upper surface 9a of the bottom plate member 8 that extends in the ceiling portion of the recess 9. A pair of pivot shafts 14b of the latch member 14 is rotatably supported by the support plates 16, so that the latch hook 14a gets in and out of the latch hole 15 by rotation of the latch member 14. The latch member 14 is continuously biased by a spring means (not shown) so as to force the latch hook 14a to get in the latch hole 15.

At the front edge of the step portion 11 of the bottom plate member 8, an operation knob-receiving portion 17 is formed by a concave portion that extends laterally to receive an operation knob 18. The operation knob 18 has a pair of support shafts 18a, 18a and the support shafts 18a, 18a are inserted into a pair of guide grooves 17a, 17a that are formed on the opposed walls in the operation knob-receiving portion 17, respectively. The guide grooves 17a, 17a extend in the anteroposterior direction of the bottom plate member 8 and support the operation knob 18 to be movable in the anteroposterior direction of the bottom plate member 8. A connecting member 19 is installed to lie between the operation knob 18 and the latch member 14. A wedge face 36 is formed at one end of the connecting member 19, so that the wedge face 36 lies beside the latch member 14. The connecting member 19 extends from the upper surface 11a of the step portion 11 of the bottom plate member 8 to the upper surface 9a of the bottom plate member 8, that is, the ceiling portion of the recess 9, through the front wall 10. The connecting member 19 is held by retaining brackets 20, 20 to be slidable in the longitudinal direction of the connecting member 19.

As illustrated in FIGS. 1 and 2, a spring means 21 is disposed between the front wall 10 and the connecting member 19 lying on the upper surface 11a of the step portion 11, so that the spring means 21 continuously biases the connecting member 19 in the direction of the operation knob 18. Due to the spring force generated by the spring means 21, the connecting member 18 forces the operation knob 18 to move in the counter direction of A, that is, in the anterior direction. As a result, the connecting member 19 is disengaged from the latch member 14 and the latch hook 14a of the latch member 14 gets in the latch hole 15.

When pressing the operation knob 18 in the direction of A and displacing the operation knob 18 backward, the connecting member 19 moves toward the latch member 14 while compressing the spring means 21. Consequently, the wedge face 36 of the connecting member 19 engages with the latch member 14 and makes the latch member 14 rotate in the direction of B. As a result, the latch hook 14a gets out of the latch hole 15.

FIG. 2 indicates that the forward and backward movement of the connecting member 19 makes the latch hook 14a of the latch member 14 get in and out of the latch hole 15.

The hinge member 7 comprises a rectangular frame 22 and a rotation axis 23 arranged under the frame 22. The rotation axis 23 extends in the horizontal direction. Guide rails 24, 25 are formed on the right and left sides of the frame 22, respectively. Slide members 26, 27 engage with the corresponding side rails 24, 25 to be slidable in the longitudinal direction. The hinge member 7 is rotatably attached to the storage box 3 as the rotation axis 23 of the hinge member 7 is superimposed on a rotation axis 23 formed in the rear portion of the opening 2 of the storage box 3. The hinge member 7 is connected to the armrest 6 by securing the slide members 26, 27 to right and left sides 28, 29 in the recess 9 of the bottom plate member 8. Consequently, the hinge member 7 is received in the recess 9 of the bottom plate member 8 of the armrest 6, simultaneously with supporting the armrest 6 so as to rotate around the rotation axis 23 of the storage box 3 and supporting the armrest 6 by means of the slide members 26, 27 so as to reciprocate in the longitudinal direction of the guide rails 24, 25.

A pair of first racks 30, 31 are secured to the rear portion of the storage box 3 and located in the posterior part of the opening 2. The first racks 30, 31 are arranged parallel to each other and the teeth of each of the first racks 30, 31 are aligned along a circular arc centering on the rotation axis 23. A pair of pinion gears 34, 34 is rotatably mounted on the frame 22 of the hinge member 7. Each of the pinion gears 34, 34 comprises a first gear 32 and a second gear 33 that are integrated with each other. The first gears 32, 32 engage with the first racks 30, 31, respectively and the second gears 33, 33 engage with the second racks 13, 13, respectively. The second racks 13, 13 are secured to the armrest 6. The rotation axis of each of the pinion gears 34, 34 is in parallel with the rotation axis 23 of the hinge member 7, that is, in parallel with the rotation axis 23 of the storage box 3. The first gears 32, 32 of the pinion gears 34, 34 continuously engage with the first racks 30, 31 of the storage box 3, respectively, while the second gears 33, 33 of the pinion gears 34, 34 continuously engage with the second racks 13, 13 of the armrest 6, respectively. Consequently, the first racks 30, 31 continuously engage with the second racks 13, 13 through the pinion gears 34, 34, respectively.

A convert mechanism for converting a turning force for rotating the lid 5 around the rotation axis 23 to a linear force for sliding the lid 5 in the transverse direction of the rotation axis 23 is used. The convert mechanism comprises the hinge member 7, the first racks 30, 31, the pinion gears 34, 34, and the second racks 13, 13. The hinge member 7 can rotate around the rotation axis 23 of the storage box 3 and holds the armrest 6 thereon. The armrest 6 can slide along the guide rails 24, 25 of the hinge member 7.

A locking hole 35 is formed on the upper surface of the frame 22 of the hinge member 7. The locking hole 35 is located on a position where the locking hole 35 is aligned with the latch hole 15 when the opening 2 of the storage box 3 is closed by the lid 5 as illustrated in FIG. 2. Consequently, when the opening 2 of the storage box 3 is closed by the lid 5 as illustrated in FIG. 2, the latch hook 14a of the latch member 14 engages with the locking hole 35 of the frame 22 through the latch hole 15 of the bottom plate member 8, thereby securing the lid 5 to the hinge member 7.

A lock mechanism for securing the armrest 6 to the hinge member 7 when the lid 5 closed the opening 2 is used. The lock mechanism comprises the latch member 14, the latch hook 14a, the latch hole 15, the locking hole 35 and a spring means for biasing the latch member 14 to fit the latch hook 14a in the latch hole 15 and the locking hole 35. Due to the lock mechanism, the locking hole 35 is not visible to a driver and passengers even when the lid 5 is opened. Consequently, the appearance of a console in which the hinge structure of a storage box lid is installed can be improved.

In order to release the lock mechanism and open the lid 5, an operator of the lid 5 pushes the operation knob 18 in the direction of A and displaces the operation knob 18 backward as illustrated in FIGS. 1 and 2, thereby moving the connecting member 19 toward the latch member 14 by compressing the spring means 21. As a result, the wedge face 36 of the connecting member 19 goes into under the connecting member 19, so that the connecting member 19 is rotated in the direction of B and the latch hook 14a is made to get out of the locking hole 35 and the latch hole 15. In other words, a release mechanism for disengaging the lid 15 from the hinge member 7 comprises the operation knob 18, the spring means 21 and the connecting member 19.

A pair of sector-shaped covers 37, 37 are fixed to the hinge member 7 so as to extend around the rotation axis 23 of the hinge member 7. When the hinge member 7 turns around the rotation axis 23 of the storage box 3, the sector-shaped covers 37, 37 move along the sides of the first racks 30, 31 in conjunction with the hinge member 7, thereby shrouding the first racks 30, 31. Consequently, the first racks 30, 31 are prevented from appearing in the vicinity of the opening 2 when opening the lid 5 and becoming an obstruction of putting in and out of luggage and also disfiguring an appearance of a console in which the hinge structure of a storage box lid is installed.

Figure 6:
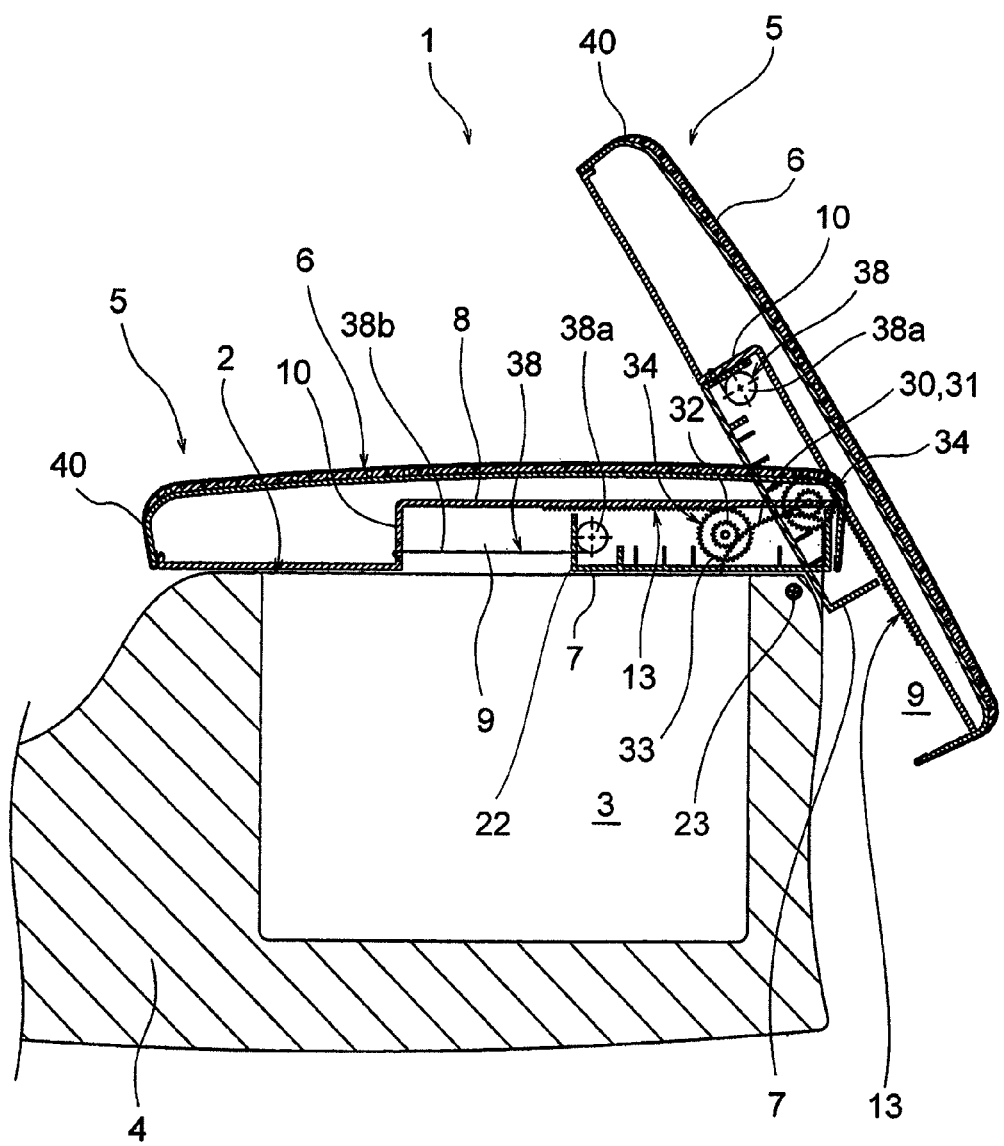
FIG. 6 is a sectional view of an embodiment of the present invention, wherein a relative part of the hinge structure equipped with a constant torque spring is illustrated.

A constant torque spring 38 may be installed between the frame 22 of the hinge member 7 and the bottom plate member 8 of the lid 5 in order that the tension force generated by the constant torque spring 39 can assist in sliding the lid 5 when opening the lid 5. As illustrated in FIGS. 1 and 6, the drum 38a of the spring 38 is rotatably attached to the frame 2 of the hinge member 7, while a front end of the leaf spring 38b is connected to the front wall 10 of the bottom plate member 8. When the lid 5 closed the opening 2 as illustrated in FIG. 6, the leaf spring 38b is drawn from the drum 38a and stretched between the bottom plate member 8 and the frame 22 of the hinge member 7, wherein the hinge member 7 is in the backmost position in the recess 9 of the bottom plate member 8.

Figure 7:
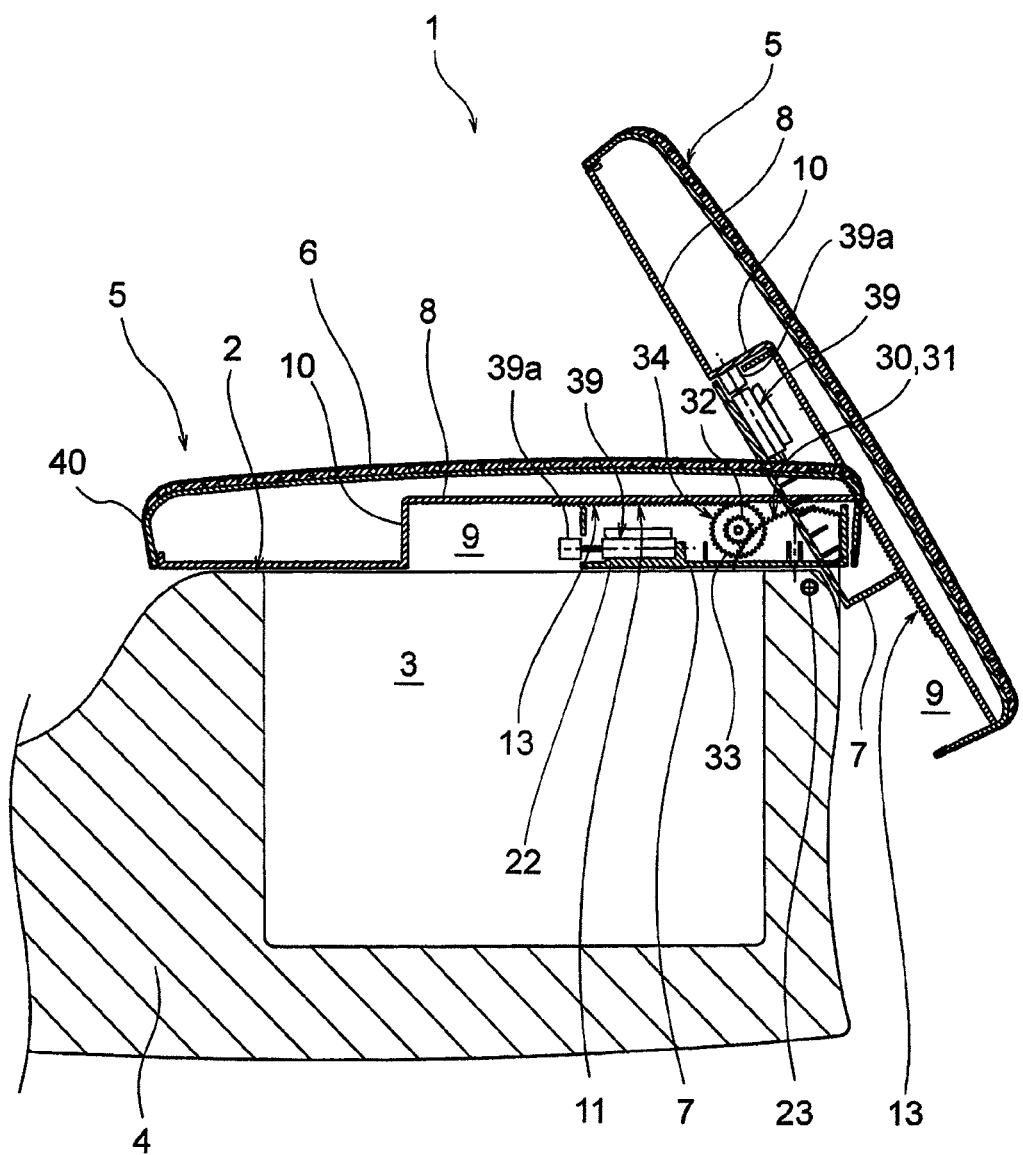
FIG. 7 is a sectional view of an embodiment of the present invention, wherein a relative part to the hinge structure equipped with a damper unit is illustrated.

The frame 22 of the hinge member 7 may be provided with a damper unit such as an oil damper 39. As illustrated in FIGS. 1 and 7, the damper 39 is mounted on the frame 22 with projecting the damping rod 39a from the frame 22 toward the front wall 10. The damper 39 generates a desired damping force after the damping rod 39a hits against the front wall 10 in the process of opening the lid 5. The adoption of the damper arrangement as stated above makes it possible, for example, to keep the damper 39 out of action during the period from the beginning of opening of the lid 5 through until just before the lid 5 is fully opened, and to make the damper 15 start to generate a damping force just before the lid 15 is fully opened. Therefore, the damper arrangement allows the lid 5 to open quickly, while it can reduce the hitting sound of the parts that will be generated when the lid 5 is fully opened. Consequently, those features can improve a commercial value of the console. The damper 39 is mounted on the hinge member 7 in the aforementioned embodiment; however, the damper 39 may be mounted on the bottom plate member 8. When mounting the damper 39 on the hinge member 7, for example, the damping rod 39a may be projected from the front wall 10 toward the hinge member 7 so that the damping rod 39a hits against the frame 22 of the hinge member 7 when the lid 5 is fully opened.

When the lid 5 closes the opening 2 of the storage box 5 as illustrated in FIG. 2, the lid 5 and the hinge member 7 cannot be relatively displaced in the horizontal direction of FIG. 2, because the latch hook 14a of the latch member 14 is made to get in the latch hole 15 of the bottom plate member 8 and the locking hole 35 of the hinge member 7. Consequently, the lid 5 keeps the opening 2 of the storage box 3 closed. Simultaneously, the leaf spring 38b is drawn from the drum 38a and stretched as illustrated in FIG. 6, when the constant torque spring 38 is installed between the frame 22 of the hinge member 7 and the bottom plate member 7. In addition, the damper rod 39a keeps projecting from the frame 22 toward the front wall 22 as illustrated in FIG. 7, when the damper 39 is mounted on the frame 22 of the hinge member 7.

When pressing the operation knob 18 in the direction of A in FIG. 2 and displacing the operation knob 18 backward, the operation knob 18 makes the connecting member 19 move toward the latch member 14 by compressing the spring means 21. Consequently, the wedge face 36 of the connecting member 19 pushes up the underside of the latch member 14 and rotates the latch member 14 in the direction of B. As a result, the latch hook 14a is disengaged from the locking hole 35 and the latch hole 15. FIG. 2 indicates that the latch hook 14a is getting in and out of the latch hole 15 and the locking hole 35.

Figure 4:
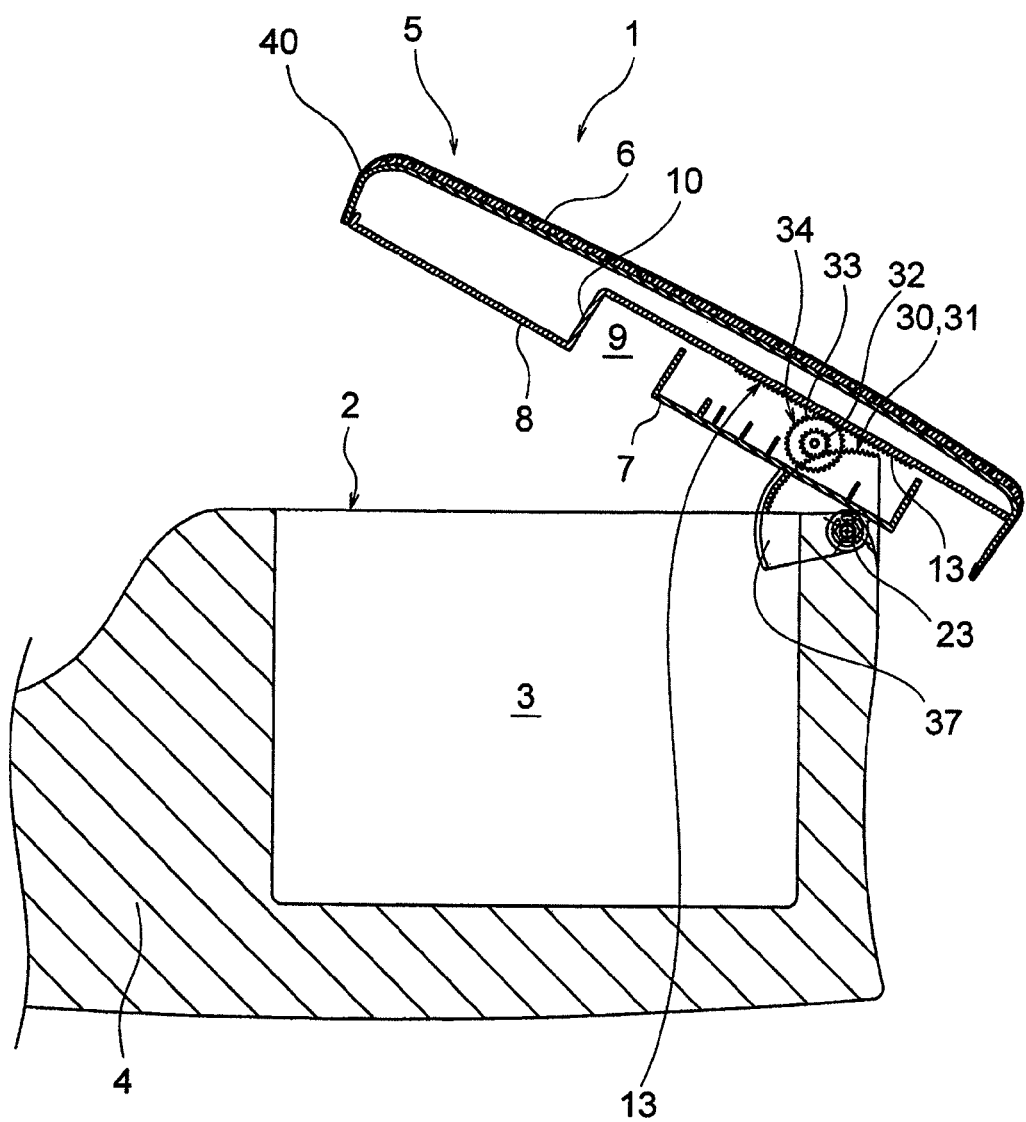
FIG. 4 is a sectional view of the storage box of FIG. 3, wherein a relevant part of the opening and closing mechanism is illustrated in the process of opening the lid.
Figure 5:
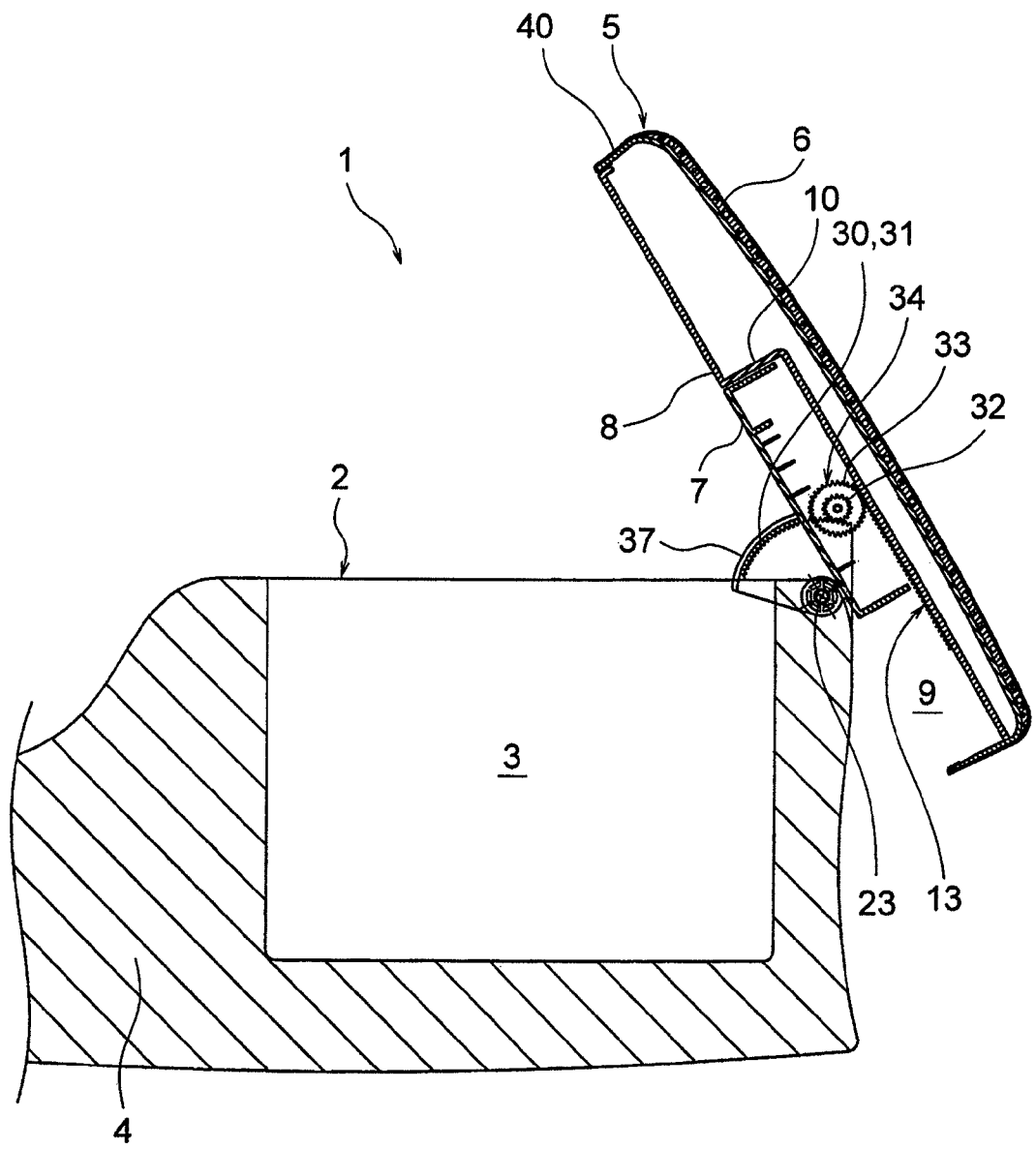
FIG. 5 is a sectional view of the storage box of FIG. 3, wherein a relative part of the opening and closing mechanism is illustrated when the lid is fully opened.

When the latch hook 14a gets out of the locking hole 35 and the latch hole 15, the lid 5 is disengaged from the hinge member 7. As a result, the lid 5 comes to be able to rotate around the rotation axis 23 and simultaneously, the lid 5 comes to be able to slide in the backward direction of the lid 5 by relatively moving in relation to the hinge member 7. FIGS. 3-5 indicate the process for opening the lid 5. When the lids 5 starts to open from the closed position illustrated in FIG. 3, the first gears 32, 32 of the pinion gears 34, 34 rotate and move along the first racks 30, 31, respectively, while the second gears 33, 33 rotate and move along the second racks 13, 13, respectively, as the lid 5 rotates around the rotation axis 23, thereby displacing the lid 5 in the right direction of FIG. 3. Consequently, the lid 5 is opened as the lid 5 is moved toward the backward of the storage box 3, so that a front end (handling end) of the lid 5 traces a generally convex and smoothly continued curve. In addition, a pair of sector-shaped covers 37, 37, which are secured to the rotation axis 23 of the hinge member 7, come up in conjunction of the hinge member 7 as the lid 5 is opening, thereby shrouding the gear portions of the first racks 30, 31 so as to prevent the first racks 30, 31 from appearing. During this period, the hinge member 7 received in the recess 9 of the bottom plate member 8 relatively moves in the direction of the front end 40 of the lid 5, so that the hinge member 7 finally hits against the front wall 10 of the armrest 6 and stops there. As illustrated in FIG. 5, the position where the hinge member 7 hits against the front wall 10 corresponds to the position where the lid 5 is fully opened.

The directions of pushing the operation knob 18 in the direction of A and sliding the lid 5 backward are the same direction toward the backward of the storage box 3. Therefore, the motion of pressing the operation knob 18 can be continued to the subsequent motion of sliding the lid 5 backward. Due to the continuity of the motions in opening the lid 5, the usability of a console can be improved.

Due to a tensile force generated by the constant torque spring 38 of FIG. 6, a force for assisting to open the lid 5 can be obtained in the process of opening the lid 5 as illustrated in FIGS. 3-5.

In addition, the damper of FIG. 7 can be set to work just before the lid 5 is fully opened, thereby reducing the hitting sound of the parts when opening the lid 5. Consequently, a commercial value of the console can be improved.

When closing the lid 5, an operator depresses the lid 5 toward the storage box 3 by following the steps of FIGS. 5-3. Specifically, the lid 5 is depressed toward the storage box 3 and the lid 5 rotates around the rotation axis 23 counterclockwise, simultaneously with moving in the forward direction of the storage box 3. Then, the lid 5 closed the opening 2 of the storage box 3 and the latch hook 14a of the latch member 14 got in the latch hole 15 of the bottom plate member 8 and the lock hole 35 of the hinge member 7, thereby securing the lid 5 to the hinge member 7. The latch hook 14a is continuously forced to get in the latch hole 15 and the locking hole 35 by means of a spring means (not shown) in order to retain mechanical connection between the lid 5 and the hinge member 7 during closure of the lid 5. The latch hook 14a continues engaging with the latch hole 15 and the locking hole 35 until the operation knob 18 rotates the latch member 14 in the direction of B.

INDUSTRIAL APPLICABILITY

The hinge structure of a storage box lid according to the present invention can be used not only as a device for opening and closing an in-vehicle console box but also as a device for opening and closing a lid of furniture items.

What is claimed is:

1. A hinge structure of a storage box lid comprising:
   a storage box having an opening,
   a lid having a front end and a rear end,
   a hinge member having a rotation axis, wherein said hinge member is disposed between said storage box and said lid so that said lid can rotate around the rotation axis to open and close said opening,
   a slide mechanism disposed between said lid and said hinge member so that said lid can move in directions toward said front end and said rear end in relation to said hinge member when opening and closing said lid, and
   a converting mechanism for converting a force for rotating said lid around the rotation axis to a force for moving said lid in the directions toward said front and rear ends through said slide mechanism, said converting mechanism causing said lid to move in the direction of said rear end when opening said lid, and said converting mechanism causing said lid to move in the direction of said front end when closing said lid.

2. The hinge structure as recited in claim 1, wherein said converting mechanism comprises:
   a first rack on said storage box and convexly curved along a circular arc centered on the rotation axis,
   a second rack located on said lid and linearly extending along the directions toward said front end and said rear end, and
   a pinion gear attached to said hinge member and rotating around an axis extending parallel to the rotation axis, wherein said pinion gear comprises
   a first gear engaging said first rack, and
   a second gear engaging said second rack to rotate in the same direction as said first gear by following the rotation of said first gear.

3. The hinge structure as recited in claim 2, wherein said pinion gear comprises a first gear engaging said first rack, and a second gear engaging said second rack and integrated with said first gear to rotate in the same direction as said first gear and at the same rotation angle as said first gear.

4. The hinge structure as recited in claim 2, wherein said hinge member includes a sector-shaped cover shrouding said first rack by rotating along a side of said first rack, together with said hinge member, when said hinge member rotates around the rotation axis.

5. The hinge structure as recited in claim 2, wherein said second gear has a larger diameter than said first gear.

6. The hinge structure as recited in claim 2, wherein said hinge structure comprises a plurality of said converting mechanisms.

7. The hinge structure as recited in any claim 1, wherein said hinge member further comprises
a lock mechanism for securing said lid to said hinge member when said opening is closed by said lid, and
a release mechanism for disengaging said lid from said hinge member when said lid is opened.

8. The hinge structure as recited in claim 1, including a tension spring disposed between said lid and said hinge member to generate a tensile force for assisting opening of said lid.

9. The hinge structure as recited in claim 1, wherein said hinge structure includes a damper unit for generating a damping force between said lid and said hinge member as said lid is fully opened.

10. The hinge structure as recited in claim 1, wherein
said lid comprises a lid body used as an armrest and a bottom plate member as an underside of said lid body,
said bottom plate member includes a recess having a front wall and right and left sidewalls,
said hinge member comprises a generally rectangular frame received in said recess, and
said slide mechanism comprises
a guide rail located on opposite side surfaces of said frame, and
a slide member secured to said opposite side surfaces and slidably engaging said guide rail.

11. The hinge structure as recited in claim 1, wherein said hinge structure includes a lock mechanism for securing said lid to said hinge member when said lid is closed, wherein said lock mechanism comprises
a latch hole piercing said bottom plate member,
a locking hole located on said frame and aligning with said latch hole when said lid is in a closed position,
a latch member attached to an upper surface of said bottom plate member in a ceiling portion of said recess,
a latch hook located on said latch member to move in and out of said latch hole and said locking hole, and
a first spring biasing said latch member to make said latch hook engaged said latch hole and said locking hole.

12. The hinge structure as recited in claim 11, wherein said hinge structure includes a release mechanism for releasing said lock mechanism when said lid is opened, wherein said release mechanism comprises
an operation knob disposed at said front end of said lid,
a connecting member lying between said operation knob and said latch member,
a second spring biasing said connecting member toward said operation knob, and
a wedge face located at an end of said connecting member to drive said connecting member through said operation knob and withdraw said latch hook from said latch hole and said locking hole.

13. The hinge structure as recited in claim 10, including a constant torque spring disposed between said front wall of said bottom plate member and said frame, said constant torque spring generating a tensile force assisting sliding movement between said lid and said hinge member when opening said lid.

14. The hinge structure as recited in claim 10, including a damper unit attached to said frame or said front wall of said bottom plate member, to reduce impact caused by a direct collision of said frame against said front wall when opening said lid.

15. The hinge structure as recited in claim 3, wherein said hinge member includes a sector-shaped cover shrouding said first rack by rotating along a side of said first rack, together with said hinge member, when said hinge member rotates around the rotation axis.

16. The hinge structure as recited in claim 3, wherein said second gear has a larger diameter than said first gear.

* * * * *